United States Patent
Golic

(10) Patent No.: US 8,243,920 B2
(45) Date of Patent: Aug. 14, 2012

(54) METHOD FOR SCALAR MULTIPLICATION IN ELLIPTIC CURVE GROUPS OVER BINARY POLYNOMIAL FIELDS FOR SIDE-CHANNEL ATTACK-RESISTANT CRYPTOSYSTEMS

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 1143 days.

(21) Appl. No.: 12/084,009

(22) PCT Filed: Oct. 28, 2005

(86) PCT No.: PCT/EP2005/011567
§ 371 (c)(1),
(2), (4) Date: Apr. 23, 2008

(87) PCT Pub. No.: WO2007/048430
PCT Pub. Date: May 3, 2007

(65) Prior Publication Data
US 2009/0052657 A1    Feb. 26, 2009

(51) Int. Cl.
*H04L 9/30*    (2006.01)
(52) U.S. Cl. .......................................... 380/30
(58) Field of Classification Search ............... 380/30
See application file for complete search history.

(56) References Cited

U.S. PATENT DOCUMENTS

| | | |
|---|---|---|
| 6,141,420 A | 10/2000 | Vanstone et al. |
| 6,212,277 B1 | 4/2001 | Miyaji |
| 6,243,467 B1 * | 6/2001 | Reiter et al. .............. 380/30 |
| 6,252,959 B1 | 6/2001 | Paar et al. |
| 6,714,648 B2 | 3/2004 | Miyazaki et al. |
| 6,738,478 B1 | 5/2004 | Vanstone et al. |

(Continued)

FOREIGN PATENT DOCUMENTS

EP    1 014 617 A3    6/2000

(Continued)

OTHER PUBLICATIONS

Sheueling Chang Shantz, "From Euclid's CGD to Montgomery Multiplication to the Great Divide", Jun. 2001, SML Tehnical Report Series, Sun Microsystems.*

(Continued)

*Primary Examiner* — Krista Zele
*Assistant Examiner* — Tamara Teslovich
(74) *Attorney, Agent, or Firm* — Finnegan, Henderson, Farabow, Garrett & Dunner, L.L.P.

(57) ABSTRACT

A method for transforming data with a secret parameter in an elliptic curve cryptosystem based on an elliptic curve defined over an underlying binary polynomial field, includes multiplying a point of the elliptic curve, and representing the data to be transformed by a scalar representing the secret parameter, wherein the multiplying includes performing at least one point addition operation and at least one point doubling operation on points of the elliptic curve. The point addition operation includes a first sequence of elementary field operations, and the point doubling operation includes a second sequence of elementary field operations, both the first and the second sequences of elementary field operations including a field inversion of coordinates of the elliptic curve points. A representation of the elliptic curve points in affine coordinates is provided and the first and second sequences of elementary field operations are balanced. The field inversion of coordinates is performed by the extended Euclidean algorithm and the balancing includes balancing the extended Euclidean algorithm by adding at least one dummy operation.

10 Claims, 7 Drawing Sheets

U.S. PATENT DOCUMENTS

| | | | | |
|---|---|---|---|---|
| 6,748,410 | B1* | 6/2004 | Gressel et al. | 708/491 |
| 7,024,559 | B1* | 4/2006 | Solinas | 713/180 |
| 7,062,043 | B1* | 6/2006 | Solinas | 380/30 |
| 7,079,650 | B1* | 7/2006 | Knudsen | 380/30 |
| 7,555,122 | B2* | 6/2009 | Moller et al. | 380/30 |
| 2001/0002486 | A1* | 5/2001 | Kocher et al. | 713/171 |
| 2001/0048742 | A1 | 12/2001 | Handschuh | |
| 2003/0059043 | A1* | 3/2003 | Okeya | 380/30 |
| 2003/0123654 | A1* | 7/2003 | Lambert | 380/28 |
| 2003/0123656 | A1 | 7/2003 | Izu et al. | |
| 2003/0142820 | A1 | 7/2003 | Futa et al. | |
| 2004/0114756 | A1* | 6/2004 | Moller et al. | 380/30 |
| 2004/0167952 | A1* | 8/2004 | Gueron et al. | 708/492 |
| 2004/0228478 | A1 | 11/2004 | Joye | |
| 2004/0247114 | A1 | 12/2004 | Joye | |
| 2005/0163312 | A1 | 7/2005 | Joye et al. | |
| 2005/0169462 | A1* | 8/2005 | Jung et al. | 380/28 |
| 2005/0201553 | A1* | 9/2005 | Katagi et al. | 380/28 |
| 2006/0093137 | A1* | 5/2006 | Izu et al. | 380/30 |
| 2007/0064931 | A1* | 3/2007 | Zhu et al. | 380/30 |
| 2008/0019509 | A1* | 1/2008 | Al-Gahtani et al. | 380/30 |

FOREIGN PATENT DOCUMENTS

| | | |
|---|---|---|
| EP | 1 160 661 B2 | 12/2001 |
| EP | 1 217 783 A1 | 6/2002 |
| WO | WO 99/04332 | 1/1999 |
| WO | WO 01/52051 A2 | 7/2001 |
| WO | WO 2007/045258 A1 | 4/2007 |

OTHER PUBLICATIONS

Shantz. From Euclid's GCD to Montogomery Multiplication to the Great Divide. Jun. 2001. http://labs.oracle.com/techrep/2001/smli_tr-2001-95.pdf.*

Trichina and Bellezza. Implementation of Elliptic Curve Cryptography with Built-In COunter Measures against Side Channel Attacks. Springer-Verlag. 2003.*

Yoon et al.; "Architecture for an Elliptic Curve Scalar Multiplication Resistant to Some Side-channel Attacks", Information Security and Cryptography, ICISC 2003, Lecture Notes in Computer Science, vol. 2971. pp. 139-151, (2003).

Hankerson et al.; "Software Implementation of Elliptic Curve Cryptography over Binary Fields", Cryptographic Hardware and Embedded Systems, CHES 2000, Lecture Notes in Computer Science, vol. 1965, pp. 1-24, (2000).

Trichina et al.; "Implementation of Elliptic Curve Cryptography with Built-In Counter Measures against Side Channel Attacks", Cryptographic Hardware and Embedded Systems, CHES 2002, Lecture Notes in Computer Science, vol. 2523, pp. 98-113, (2002).

Brier et al.; "Weierstraβ Elliptic Curves and Side-Channel Attacks", Public Key Cryptography, International Workshop on Practice and Theory in Public Key Cryptography, XP-001068195, pp. 335-345, (2002).

Golic; "A Method for Scalar Multiplication in Elliptic Curve Groups Over Prime Fields for Side-Channel Attack Resistant Cryptosystems", U.S. Appl. No. 12/083,861, filed Apr. 18, 2008.

Okeya et al., "Efficient Elliptic Curve Cryptosystems from a Scalar Multiplication Algorithm with Recovery of the y-Coordinate on a Montgomery-form Elliptic Curve," Cryptographic Hardware and Embedded Systems—CHES 2001, Lecture Notes in Computer Science, vol. 2162, pp. 126-141, (2001).

Fouque et al., "The Doubling Attack—Why Upwards is Better Than Downwards," Cryptographic Hardware and Embedded Systems—CHES 2003, Lecture Notes in Computer Science, vol. 2779, pp. 269-280, (2003).

Kocher et al., "Differential Power Analysis," Advances in Cryptology-Crypto '99, Lecture Notes in Computer Science, vol. 1666, pp. 388-397, (1999).

Kocher; "Timing Attacks on Implementations of Diffie-Hellman, RSA, DSS, and Other Systems," Advances Cryptology-Crypto '96, Lecture Notes in Computer Science, vol. 1109, pp. 104-113, (1996).

Billet, L. et al., "The Jacobi Model of an Elliptic Curve and Side-Channel Analysis," Applied Algebra, Algebraic Algorithms and Error-Correcting Codes, International Symposium AAECC, pp. 34-42, XP001160517, (May 12, 2003).

Chevallier-Mames et al., "Low-Cost Solutions for Preventing Simple Side-Channel Analysis: Slide-Channel Atomicity," IEEE Transactions on Computers, vol. 53(6), pp. 760-768, (2004).

Coron, "Resistance Against Differential Power Analysis for Elliptic Curve Cryptosystems," Cryptographic Hardware and Embedded Systems—CHES '99, Lecture Notes in Computer Science, vol. 1717, pp. 292-302, (1999).

Gebotys, "Design of Secure Cryptography Against the Threat of Power-Attacks in DSP-Embedded Processors," ACM Transactions on Embedded Computing Systems, XP002356343, vol. 3, No. 1, pp. 92-113, (2004).

Gebotys et al., "Secure Elliptic Curve Implementations: An Analysis of Resistance to Power-Attacks in a DSP Processor," Cryptographic Hardware and Embedded Systems—CHES 2002, Lecture Notes in Computer Science, vol. 2523, pp. 114-128, (2002).

Koyama et al., "Speeding up Elliptic Cryptosystems by Using a Signed Binary Window Method," Advances in Cryptology-Crypto '92, Lecture Notes in Computer Science, vol. 740, pp. 345-357, (1993).

* cited by examiner

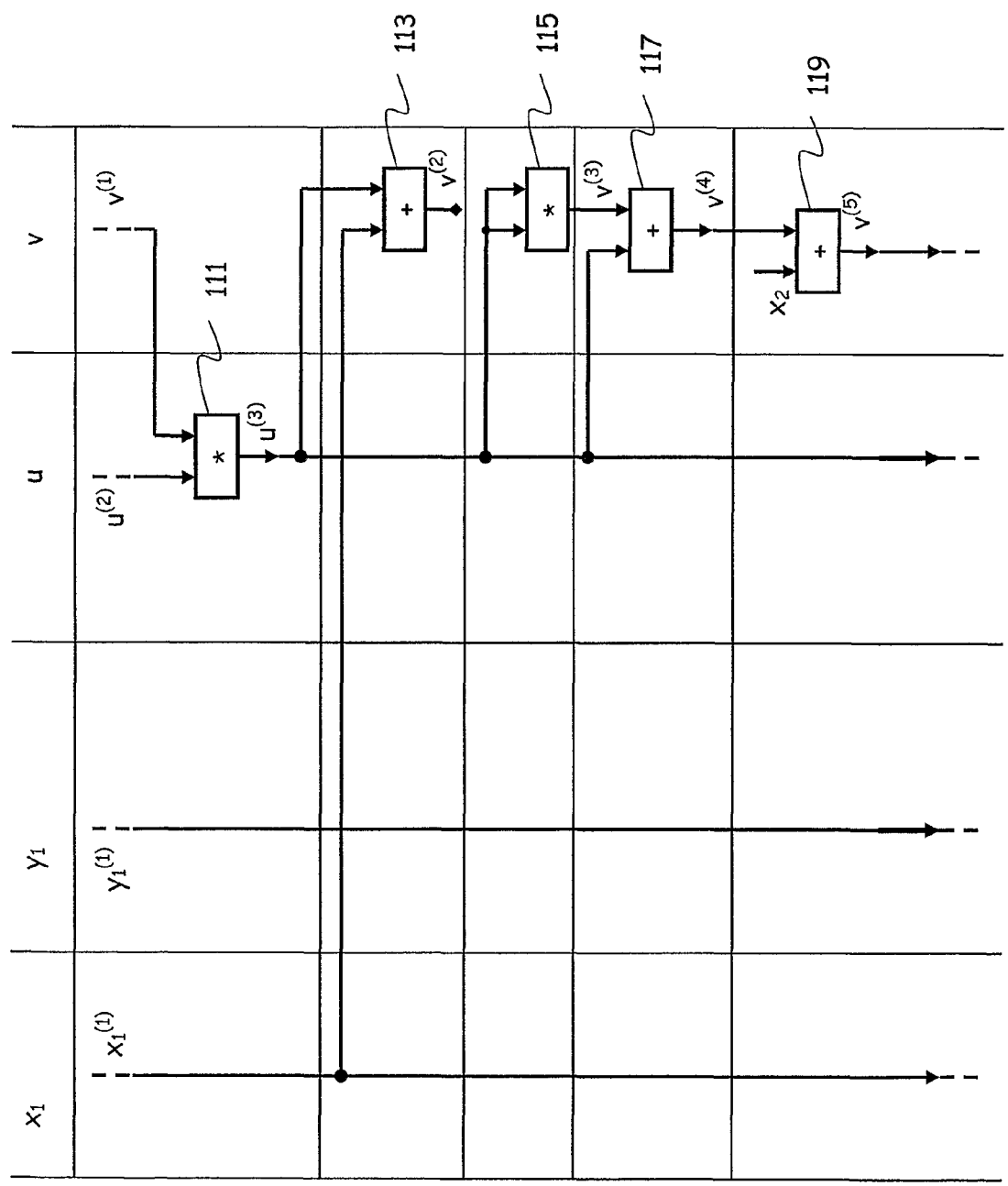

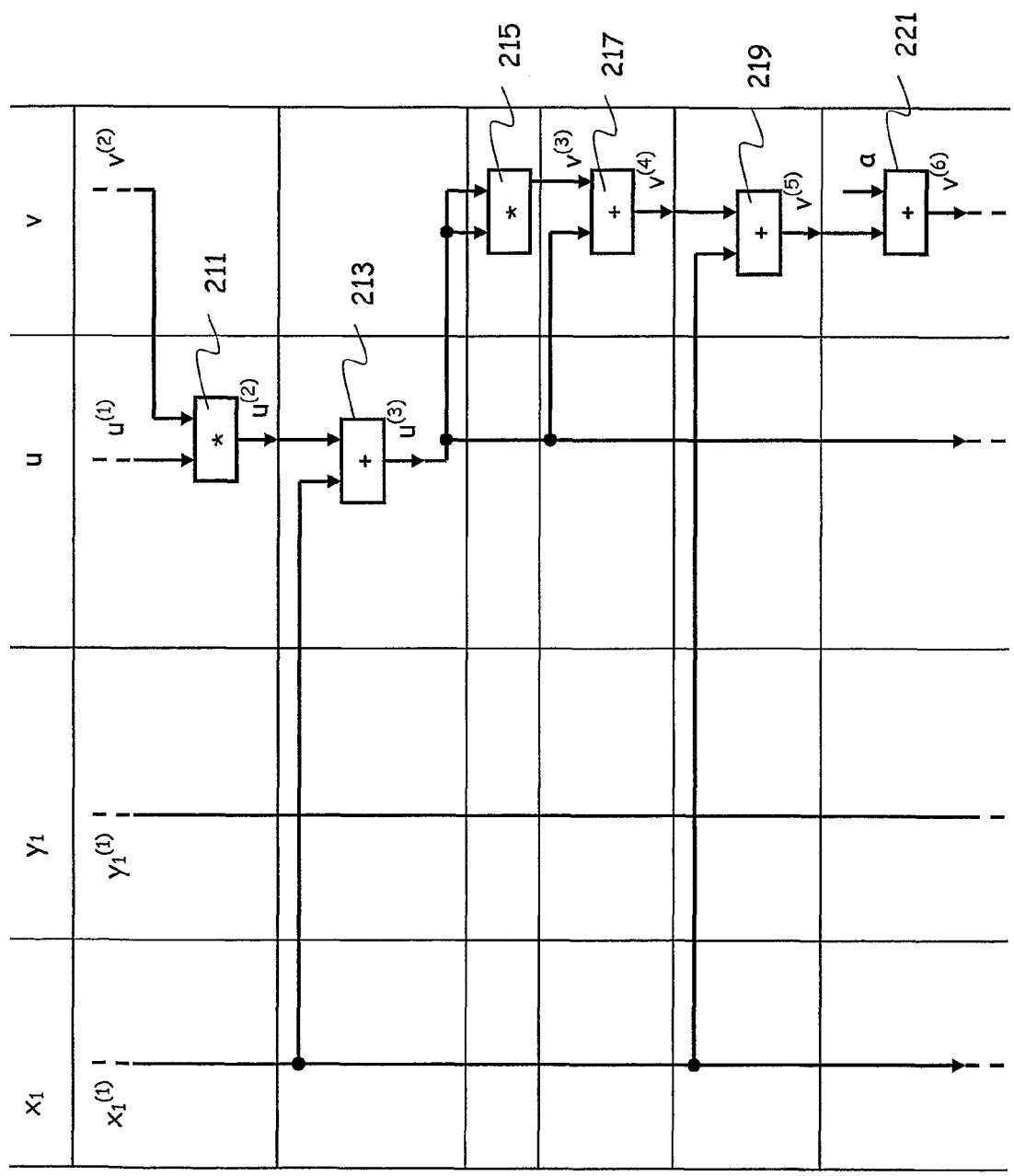

METHOD FOR SCALAR MULTIPLICATION IN ELLIPTIC CURVE GROUPS OVER BINARY POLYNOMIAL FIELDS FOR SIDE-CHANNEL ATTACK-RESISTANT CRYPTOSYSTEMS

CROSS REFERENCE TO RELATED APPLICATION

This application is a national phase application based on PCT/EP2005/011567, filed Oct. 28, 2005, the content of which is incorporated herein by reference.

BACKGROUND OF THE INVENTION

1. Field of the Invention

The present invention generally relates to the field of cryptography, particularly to cryptographic methods and devices and, even more particularly, to methods for preventing security attacks to cryptosystems based on information leakage.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

In modem data communication systems, a wide use of cryptographic techniques providing confidentiality and authenticity of information was enabled by the invention (by W. Diffie and M. Hellman in 1976) of so-called "public-key cryptosystems", which provide efficient solutions to the inherent secret-key management problem.

In particular, public-key cryptosystems are mostly used for Diffie-Hellman key exchange, for digital signatures, and for encrypting secret session keys to be used in secret-key cryptosystems. For example, they are used in the Internet protocols including Secure Socket Layer (SSL), Internet Protocol Security (IPSec), and Pretty Good Privacy (PGP).

Elliptic Curve Cryptosystems (ECCs), proposed independently by V. S. Miller in 1985 and N. Koblitz in 1987, are evolving as an efficient alternative to classical public-key cryptosystems, such as Diffie-Hellman key exchange based on finite field multiplicative groups and RSA, invented by R. L. Rivest, A. Shamir, and L. Adleman in 1978, by offering the same security level for much smaller key sizes, thus allowing for more efficient implementations both in hardware and software.

Typical ECCs include cryptographic protocols such as Elliptic Curve Diffie-Hellman (ECDH), used for secret key exchange, and Elliptic Curve Digital Signature Algorithm (ECDSA), adopted as international standard ANSI X9.62, used for digital signatures. These protocols are also covered by the IEEE 1363 series of standards.

ECCs are based on mathematical entities called "elliptic curve groups". An elliptic curve group is defined as an Elliptic Curve (EC), which is a set of solutions, called "points", to an elliptic curve equation, together with an appropriately defined operation among the points on the curve.

The basic two types of ECs are defined over the fields containing a prime number of elements and over the fields with a number of elements being an integer power of 2. The former are also called "prime fields" or "integer fields" or "fields of a prime characteristic", their elements are integers, and operations of addition and multiplication are defined modulo a prime number. The latter are also called "binary polynomial fields" or "fields of characteristic 2", their elements are binary polynomials, and operations of addition and multiplication are defined as addition and multiplication of polynomials modulo an irreducible polynomial, respectively.

A binary polynomial field $F_{2^m}$, i.e., a finite field of characteristic 2, is a finite field with $2^m$ elements, where m is a positive integer, which represents the dimension or the bit size of the field $F_{2^m}$. It is composed of a set of polynomials over the binary field $F_2$ whose degree is at most m−1, together with the operations of addition and multiplication defined as addition and multiplication of polynomials modulo an irreducible polynomial of degree m over $F_2$, respectively. By irreducible polynomial over $F_2$ there is meant a polynomial that cannot be written as a product of two polynomials over $F_2$ having degrees of at least 1. In other words, the elements of the field $F_{2^m}$, are binary polynomials of degree less than m, and, given an irreducible polynomial f(z) of degree m, called "reduction polynomial", the sum of two elements a(z) and b(z), also denoted as a+b, is defined as (a(z)+b(z)) mod f(z)=a(z)+b(z), that is, the coefficients are simply bitwise added, which is an operation also denoted as a⊕b, and the product of the two elements a(z) and b(z), also denoted as a·b, is defined as (a(z)·b(z)) mod f(z), that is, as the remainder obtained after dividing the product a(z)·b(z) by f (z).

The binary addition, i.e., the addition in $F_2$, is the same as an addition modulo 2 or a logic XOR operation, whereas the binary multiplication, i.e., the multiplication in $F_2$, is the same as a logic AND operation. For the purposes of the present description, a polynomial of degree less than m is defined as a vector of m coefficients, $a(z)=a_{m-1}z^{m-1}+a_{m-2}z^{m-2}+\ldots+a_1z+a_0=a=(a_{m-1},a_{m-2},\ldots,a_1,a_0)$, whereas the sum and the product of polynomials are defined as usual. As an alternative to this representation, called the "polynomial basis" representation, other representations can also be used, such as the so-called "normal basis" representation.

According to the Weierstrass equation, an elliptic curve $E(F_{2^m})$: $y^2+xy=x^3+ax^2+b$ over the field $F_{2^m}$, specified by the parameters $a,b \in F_{2^m}$ such that $b \neq 0$, is defined as the set of points P=(x,y), x,y∈$F_{2^m}$, being the solutions to the equation:

$$y^2+xy=x^3+ax^2+b,$$

together with a special, neutral point O, also called "point at infinity". The couple (x,y) represents the x-coordinate and the y-coordinate of a generic point P on an elliptic curve.

An elliptic curve forms a group with respect to the operation of addition that is defined as follows.

Neutral point: P+O=O+P=P for all P=(x,y)∈E($F_{2^m}$).

Negative point: If P=(x,y)∈E($F_{2^m}$), then (x,y)+(x,x⊕y)=O, and the point (x,x⊕y)∈E($F_{2^m}$) is denoted as −P and called the negative of the point P.

Addition of points: Let P=($x_1,y_1$)∈E($F_{2^m}$) and Q=($x_2,y_2$)∈E($F_{2^m}$), where P≠±Q. Then P+Q=($x_3,y_3$), where $$x_3 = \lambda^2 + \lambda + x_1 + x_2 + a, \quad y_3 = \lambda(x_1+x_3)+x_3+y_1, \quad \lambda = \frac{y_2+y_1}{x_2+x_1}.$$

Doubling of a point: Let P=($x_1,y_1$)∈E($F_{2^m}$), where P≠O. Then P+P=2P=($x_3,y_3$), where $$x_3 = \lambda^2 + \lambda + a, \quad y_3 = \lambda(x_1+x_3)+x_3+y_1, \quad \lambda = x_1 + \frac{y_1}{x_1}.$$

It can be appreciated that the expressions for the point doubling operation are the same as those for the point addition, due to fact that $x_1+x_1=0$, except for the value of $\lambda$, which is different. Consequently, both the addition and the doubling of points can be performed as sequences of multiplications, squaring operations, additions, and inversions in $F_{2^m}$.

To avoid computing the inversion, which is typically a more complex operation than computing the other operations in the field $F_{2^m}$, an elliptic curve point can be represented by the so-called "projective coordinates", instead of the classical, affine coordinates. The corresponding expressions do not include the inversion, but the number of multiplications is increased.

The main operation over elliptic curve groups that is required for cryptosystems such as ECDH or ECDSA is a repeated addition of a generic point P with itself k−1 times, P+ . . . +P, an operation called the "scalar multiplication" of a base point P by a scalar k and is denoted as kP, where k is a positive integer. In practical applications, k is a secret and very big number, typically, several hundred bits long.

It is known in the art that the scalar multiplication can be computed efficiently by using an algorithm called "double-and-add", in the left-to-right (i.e., going from the most significant bit of k downwards) or right-to-left (from the least significant bit of k upwards) manner, where $$k = (k_{t-1}, k_{t-2}, \ldots, k_1, k_0)_2 = \sum_{i=0}^{t-1} k_i 2^i.$$

The algorithm consists of a series of point doublings and point additions, where the positions of point additions depend on the scalar k. More precisely, the algorithm consists of t iterations, each iteration consisting of a point doubling that is followed by a point addition only if the corresponding scalar bit is equal to 1.

It is known in the art that if a cryptographic algorithm, such as, for example an ECC, is implemented on a microelectronic device, e.g., an integrated circuit chip card, then even for tamper-resistant chips, where the underlying integrated circuit is protected by special physical measures, such as protective layers and various sensors and detectors, the sensitive information, which is dependent on the underlying secret or private key, may leak out through various side channels while being processed during the execution of the cryptographic algorithm. For example, the sensitive information may leak out through measurements of the timing, power consumption, and electromagnetic radiation, as well as monitoring of signals by micro-probing. The objective of these "side-channel" attacks is to recover the secret key by using the information leaking out from said side channels.

In particular, the timing attacks were introduced by P. Kocher, in "Timing attacks on implementations of Diffie-Hellman, RSA, DSS, and other systems," Advances in Cryptology—Crypto '96, Lecture Notes in Computer Science, vol. 1109, pp. 104-113, 1996; the power analysis attacks were introduced by P. Kocher, J. Jaffe, and B. Jun, in "Differential power analysis," Advances in Cryptology—Crypto '99, Lecture Notes in Computer Science, vol. 1666, pp. 388-397, 1999.

The two basic power analysis attacks are referred to as "Simple Power Analysis" (SPA) attacks and "Differential Power Analysis" (DPA) attacks. An SPA attack utilizes a single power consumption curve and tries to deduce information about the secret key from this curve, whereas a DPA attack utilizes a set of power consumption curves, guesses a part of the secret key, and then verifies if the guess is correct by a simple processing of the curves according to the corresponding guess. The timing attacks can utilize single or multiple measurements.

The timing and power analysis attacks do not require expensive resources, and most implementations, without specific countermeasures incorporated therein, are vulnerable to them. Therefore, there is a need to protect the sensitive data from side-channel attacks by appropriate changes in the cryptographic algorithm, of course, without changing the overall functionality of the algorithm.

A problem with a direct implementation of the double-and-add algorithm for performing the scalar multiplication is that the computations required for the point addition and the point doubling in general are different. As a consequence, the timing, as well as the power consumption of a hardware device implementing the cryptographic algorithm may depend on the secret scalar k. Thus, the double-and-add algorithm is potentially vulnerable to the timing attack and SPA attack: by analyzing the timing and/or the power consumption curve it may be possible to identify the iterations where the point addition is effectively performed, that is, when the scalar bit is equal to 1, and thus reconstruct the secret scalar.

For elliptic curves over binary polynomial fields, the computations required for the point addition and point doubling are not the same, the difference mainly coming from the computation of the variable $\lambda$. Accordingly, in affine coordinates, the difference in the computation only relates to the total number of field additions, and not to the total number of field inversions, multiplications, or squaring operations (shortly, squarings), which are computationally more complex. However, the timing and power consumption associated with the inversion, which is the computationally most expensive operation, significantly depend on the operand being inverted, and this may be a source of information leakage. On the other hand, in projective coordinates, the difference also relates to the field operations of multiplication and squaring.

One known way of dealing with the problem of unbalanced computations, especially in projective coordinates, is to modify the basic double-and-add algorithm by introducing a dummy point addition whenever the corresponding scalar bit is equal to 0, which results in the so-called "double-and-add-always" algorithm, or, possibly, to perform other algorithms, as sequences of point doublings, additions, and subtractions, which differ from the double-and-add algorithm in that they have a more balanced timing and power consumption. Typically, the modified algorithms or new algorithms require a considerable increase of the total time needed, but the point addition and point doubling need not be indistinguishable. The following documents describe algorithms of this type.

EP 1,160,661 A describes several algorithms for scalar multiplication of the double-and-add-always type including those where the order or point additions and doublings is randomized, the proposed algorithms being especially suitable for elliptic curves in the so-called Montgomery form.

U.S. Pat. No. 6,738,478 B1 proposes a variant of the Montgomery ladder algorithm for scalar multiplication that is claimed to provide resistance to timing and SPA attacks, for elliptic curves over binary polynomial or prime fields.

US 2003/0123656 A1 discloses two scalar multiplication algorithms of the double-and-add-always type in which the point addition and doubling can be performed simultaneously at the expense of introducing some auxiliary variables. In addition, a number of techniques for the point addition and doubling are also proposed, and they relate to elliptic curves over arbitrary finite fields.

Another known method, suggested by E. Trichina and A. Bellezza in "Implementation of elliptic curve cryptography with built-in counter measures against side channel attacks," Cryptographic Hardware and Embedded Systems—CHES 2002, Lecture Notes in Computer Science, vol. 2523, pp. 98-113, 2002, aims at balancing the computations required for the point addition and point doubling themselves. The method involves the use of projective Jacobian coordinates, and consists in splitting the point addition in two parts, and in representing the point doubling and each part of the point addition by the same sequence of field operations (with different operands), by introducing some dummy elementary operations and by an appropriate reordering of the elementary operations. This makes it difficult to identify the iteration steps when the scalar bit equals 1, in scalar multiplication algorithms such as the double-and-add algorithm.

US 2005/0163312 A1 proposes another method for balancing the computations for the point addition and point doubling. The method uses affine coordinates and consists in representing the point addition and point doubling by the same sequence of field operations (with different operands), by introducing some dummy field additions and by an appropriate reordering of the elementary operations. The sequence of operations includes one field division, one field squaring, and a number of field multiplications and additions.

J. C. Yoon, S. W. Jung, and S. Lee in "Architecture for an elliptic curve scalar multiplication resistant to some side-channel attacks," Information Security and Cryptography—ICISC 2003, Lecture Notes in Computer Science, vol. 2971, pp. 139-151, 2003, propose a sort of double-and-add always algorithm for scalar multiplication for elliptic curves over binary polynomial fields in affine coordinates, in which some operations of point addition and point doubling are parallelized, thus achieving a better performance. Also, a randomized version of the Montgomery inverse algorithm for the inversion operation is proposed, providing some resistance to timing attacks as well as SPA and DPA attacks.

Yet another known method is to randomize the scalar multiplication algorithm by randomizing the elliptic curve in question, the base point, the coordinates, and/or the secret scalar itself, without changing the final result. This also helps counteract the DPA attack, in addition to the timing attack and SPA attack.

In particular, it is suggested by P. Kocher, in "Timing attacks on implementations of Diffie-Hellman, RSA, DSS, and other systems," Advances in Cryptology—Crypto '96, Lecture Notes in Computer Science, vol. 1109, pp. 104-113, 1996, to randomize the scalar by adding thereto a random integer multiple of the base point order, n, in view of the fact that $kP=kP+rnP=(k+rn)P$. More precisely, this was suggested by using the multiplicative instead of additive terminology for a group operation, in which the exponentiation is an analog of the scalar multiplication.

J.-S. Coron explicitly suggested in "Resistance against differential power analysis for elliptic curve cryptosystems," Cryptographic Hardware and Embedded Systems—CHES '99, Lecture Notes in Computer Science, vol. 1717, pp. 292-302, 1999, that a 20-bit random number r may be sufficient, but it was later shown by P.-A. Fouque and F. Valette, in "The doubling attack—Why upwards is better than downwards," Cryptographic Hardware and Embedded Systems—CHES 2003, Lecture Notes in Computer Science, vol. 2779, pp. 269-280, 2003, that under some conditions this is not sufficiently secure, especially if the bit size of r is relatively small and if one can distinguish the point addition from the point doubling.

Another technique for randomizing the scalar consists in splitting the scalar in two random parts by using the integer addition modulo n, according to $k=k_1+k_2 \bmod n$, and then to compute $kP=k_1P+k_2P$. An example of such a technique combined with the representation of points in the projective Jacobian coordinates is provided in EP 1,217,783 A1.

In U.S. Pat. No. 6,252,959 B1, the radix representation of the scalar in base of the form $2^k$ in a scalar multiplication algorithm is used, in order to reduce the total number of field inversions required, for elliptic curves over binary polynomial fields.

U.S. Pat. No. 6,141,420 describes a set of techniques for scalar multiplication and underlying field operations for elliptic curves over binary polynomial fields by using the normal basis representation. Emphasis is put on efficient computation rather than resistance to side-channel attacks.

SUMMARY OF THE INVENTION

The Applicant observed that the known ECCs may not be sufficiently efficient or sufficiently secure against side-channel attacks.

In respect of the algorithms disclosed in US 2003/0123656 A1, the Applicant observes that although they may provide a certain resistance to timing and SPA attacks, and reduce the time, the computational cost is not reduced. The Applicant also observes that the two algorithms are essentially minor variations of the well-known double-and-add-always algorithm and the algorithm known as the "Montgomery ladder", respectively. In addition, the points are represented in projective coordinates, but the resulting sequences of elementary operations are not balanced.

The "double-and-add-always" algorithms, e.g., those proposed in EP 1,160,661 A and U.S. Pat. No. 6,738,478, are very costly in terms of time and power consumption, as the number of point additions is significantly increased.

Concerning U.S. Pat. No. 6,252,959 B1, the Applicants observes that some pre-computation is required, and resistance to side-channel attacks is not considered.

In respect of U.S. Pat. No. 6,141,420, the Applicant observes that emphasis is put on the efficient computation rather than resistance to side-channel attacks.

As for the proposal of E. Trichina and A. Bellezza to work in projective Jacobian coordinates, the Applicant observes that the field inversion operation is generally easier to implement in binary polynomial fields than in prime fields, so that there may not be a need to work in projective coordinates at all.

The method proposed in US 2005/0163312 A1 works in affine coordinates and assumes that a field division is given as an elementary operation. However, this operation is computationally very expensive and, in terms of timing and power consumption, significantly dependent on the operands being divided. As such, it may be a source of information leakage, e.g., with respect to the timing and DPA attacks. So, there is an additional need to balance the division operation itself.

As for the method proposed by P. Kocher, the Applicant observes that the scalar randomization does not provide a perfect protection against DPA attacks.

The technique consisting in splitting the scalar in two random parts by using the integer addition modulo n can potentially provide a perfect protection against DPA attacks, but generally doubles the computational cost.

In view of the state of the art outlined in the foregoing, the Applicant tackled the general problem of increasing the security of cryptosystems, particularly of ECCs, and even more particularly of ECCs defined over binary polynomial fields, against side-channel attacks, by finding alternative solutions, possibly more effective than the existing ones.

Even more particularly, the Applicant faced the problem of increasing the security against side-channel attacks, like timing, SPA, and DPA attacks, of the operations of scalar multiplication of a generic point of an elliptic curve by a scalar (the secret parameter), such operations being quite common in ECCs, and possibly being implemented as double-and-add operations.

The Applicant found that a convenient way to securely perform the double-and-add (or other similar) operations is to exploit affine coordinates; despite the fact that the adoption of this coordinates involves an operation of inversion, the computational complexities of the sequences of elementary operations corresponding to the point addition and point doubling can be balanced, and thus it is made more difficult for a side-channel attacker to gain knowledge of the secret scalar.

The starting point of the Applicant was that the point addition and point doubling operations, which make up the double-and-add algorithm used for performing scalar multiplication, when performed in affine coordinates, can be rendered perfectly balanced as sequences of elementary operations such as multiplications, squaring operations, inversions, and additions in the underlying field of characteristic 2, by introducing a small number of dummy operations in one or both of them; in particular, according to a preferred embodiment of the present invention, at most one dummy addition inserted in the point addition algorithm and at most three dummy additions inserted in the point doubling algorithm, respectively, are sufficient to ensure balancing. As in fields of characteristic 2 a squaring operation can be performed in a much simpler way than a multiplication, it is not assumed that these two operations cannot be distinguished from each other, with respect to timing and power consumption.

The Applicant additionally observed that balanced sequences of field operations for the point addition and point doubling are not sufficient for the resistance against the timing and SPA attacks, as the computationally most expensive operation, the field inversion, is significantly dependent, as far as timing and power consumption are concerned, on the operand being inverted.

In a preferred embodiment of this invention, the field inversion is performed on the basis of the well-known Extended Euclidean Algorithm (e.g., described by D. Hankerson, J. L. Hernandez, and A. Menezes in "Software implementation of elliptic curve cryptography over binary fields," Cryptographic Hardware and Embedded Systems—CHES 2000, Lecture Notes in Computer Science, vol. 1965, pp. 1-24, 2000); in particular, the Extended Euclidean Algorithm is (at least partially) balanced, in order to achieve a higher resistance against the timing and SPA attacks. In particular, the Extended Euclidean Algorithm is balanced by adding at least one dummy operation, in such a way that after comparing the respective degrees of two binary polynomials being iteratively processed in the algorithm, a same sequence of operations is performed regardless of the result of the comparison.

The Applicant points out that, in practice, efficient implementations of the method of the present invention are possible, despite the necessity of computing the inversion, provided that computing the inversion has a time complexity not more than a relatively small number of times (e.g., about six times) larger than computing the multiplication. In particular, this appears to be feasible to achieve in hardware implementations, e.g., if the field inversion is performed by using the known Extended Euclidean Algorithm.

In a preferred embodiment of the invention, to further increase a resistance to the timing and SPA attacks and to practically eliminate the leakage of the Hamming weight of the scalar representing the secret parameter (i.e., the total number of 1's in the binary representation) in the double-and-add type of scalar multiplication algorithms, as well as to achieve a practical resistance against the DPA attacks, the scalar is randomized, by using a sufficiently large random number (e.g., 32 to 128 bits long), depending on the desired security level.

By using the proposed balanced algorithms for the point addition and point doubling, together with the proposed balanced algorithm for the field inversion, it is possible to perform the scalar multiplications involved in many cryptographic algorithms based on ECs in a more secure way, resistant at least to certain types of side-channel attacks. In particular, the proposed balanced algorithms are useful for implementing the point addition and point doubling operations making up the double-and-add algorithm, but are not limited to this: more generally, they can be used in any scalar multiplication algorithm defined as a sequence of point doublings, additions, and subtractions.

According to an aspect of the present invention, a method is provided for transforming data with a secret parameter in an elliptic curve cryptosystem based on an elliptic curve defined over an underlying binary polynomial field.

The method comprises multiplying a point of the elliptic curve, said point representing the data to be transformed, by a scalar representing the secret parameter, wherein said multiplying includes performing at least one point addition operation and at least one point doubling operation on points of the elliptic curve, said point addition operation comprising a first sequence of elementary field operations and said point doubling operation comprising a second sequence of elementary field operations, both said first and second sequence of elementary field operations including a field inversion of coordinates of the elliptic curve points.

The method is characterized by further comprising:
  providing a representation of the elliptic curve points in affine coordinates; and
  balancing said first and second sequences of elementary field operations,
wherein said field inversion of coordinates is performed by the Extended Euclidean Algorithm and said balancing includes balancing said Extended Euclidean Algorithm by adding at least one dummy operation.

In particular, said balancing the Extended Euclidean Algorithm includes:
  after comparing respective degrees of two binary polynomials being iteratively processed in the algorithm, performing a same sequence of operations regardless of the result of said comparing.

Another aspect of the present invention concerns a device for transforming data with a secret parameter, comprising an integrated circuit adapted to perform the method of the above aspect.

BRIEF DESCRIPTION OF THE DRAWINGS

The features and advantages of the present invention will be made apparent by the following detailed description of some embodiments thereof, provided merely by way of non-limitative examples, description that will be carried out making reference to the attached drawings, wherein:

FIGS. 1A to 1C show a schematic block diagram of a circuit adapted to implement an algorithm for point addition in affine coordinates, according to an embodiment of the present invention;

FIGS. 2A to 2C show a schematic block diagram of a circuit adapted to implement an algorithm for point doubling in affine coordinates, according to an embodiment of the present invention.

DETAILED DESCRIPTION OF THE PREFERRED EMBODIMENT(S)

Figure 1A:
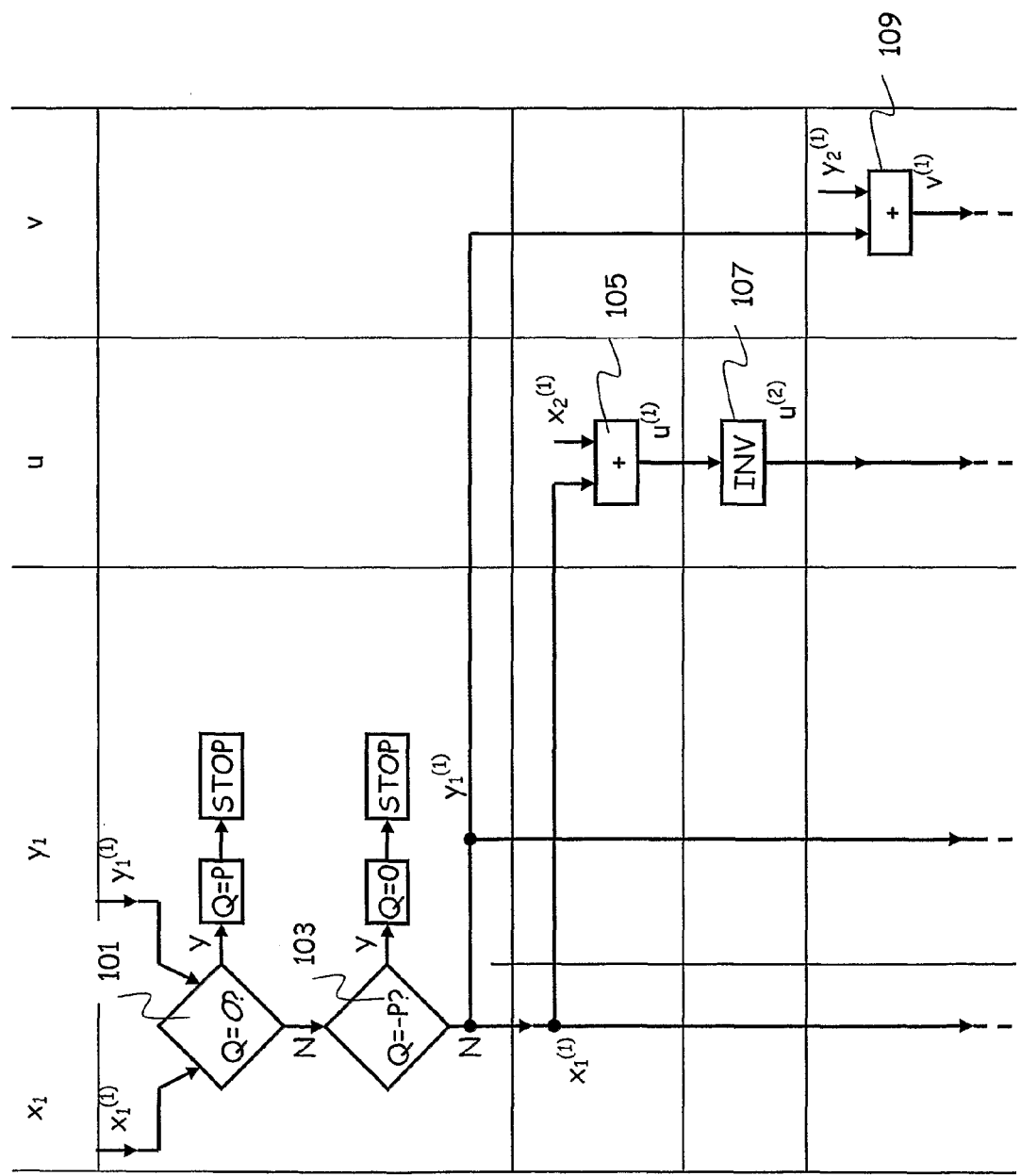

As discussed in the introductory part of the present description, the main operation over elliptic curve groups that is required for cryptosystems such as ECDH or ECDSA is the scalar multiplication of a base point P by a scalar k, and is denoted as kP, where k is a positive integer; this operation is a repeated addition of a point P with itself k−1 times, i.e., P+ . . . +P, and, in practical cryptographic applications, k is a secret and very large number, typically, several hundred bits long, e.g., a secret key.

The scalar multiplication can be computed efficiently using the double-and-add algorithm; in particular, assuming a binary representation for the number k.

$$k = (k_{t-1}, k_{t-2}, \ldots, k_1, k_0)_2 = \sum_{i=0}^{t-1} k_i 2^i.$$

the double-and-add algorithm can implemented in the left-to-right manner, going from the most significant bit of the number k downwards, or in the right-to-left manner, going from the least significant bit of the number k upwards.

A functional block adapted to implement (in hardware or software or a mix of the two) the double-and-add algorithm receives in input the base point P and the scalar k, and, at the end of the computation, returns the desired result of the scalar multiplication as a resulting point Q, which is also used as an auxiliary variable during the computations.

According to an embodiment of the present invention, the base point P and the resulting point Q are both represented in affine coordinates.

For example, the left-to-right implementation of the double-and-add algorithm, where the intermediate point (auxiliary variable) Q is represented in affine coordinates is given as follows.

| Double-and-add, left-to-right, scalar multiplication | |
|---|---|
| Input: | $k = (k_{t-1}, k_{t-2}, \ldots, k_1, k_0)_2$ |
| | $P = (x_1, y_1)$ in affine coordinates |
| Output: | $Q = kP$ in affine coordinates |
| $Q \leftarrow O$ | |
| for i from t − 1 down to 0 | |
| $\quad Q \leftarrow 2Q$ | |
| $\quad$ if $k_i = 1$ then $Q \leftarrow Q + P$ | |

For simplicity, the algorithm is presented in its basic form, which may be vulnerable to the timing or SPA attacks due to a slight imbalance of operations even if the point addition and point doubling are perfectly balanced. Namely, in this form, the logic "if" instruction is performed after each point doubling, but it is not performed after point additions. Balancing can be achieved by introducing a dummy logic "if" instruction after the point addition with a condition that is never satisfied, e.g., "if $k_1=0$ then stop".

For a t-bit scalar k, t point doubling operations need to be computed, and, on average, t/2 point additions. If the number k is not bigger than the order of the point P, which is defined as the minimal positive integer n such that nP=O, then it is guaranteed that in each iteration of the algorithm it is true that Q≠P, so that the addition of different points is then performed.

The Applicant found that by introducing a small number of dummy operations in the basic sequences of elementary field operations for performing the point addition and the point doubling operations in affine coordinates that compose the double-and-add algorithm, the two resulting sequences are balanced in terms of sequences of elementary field operations, said field operations including inversion, multiplication, squaring operation, and addition. As in fields of characteristic 2 a squaring operation can be performed much simpler than a multiplication, it is not assumed that these two operations cannot be distinguished from each other, with respect to timing and power consumption. In particular, the Applicant found that introducing one supplementary dummy addition in the point addition and three supplementary dummy additions in the point doubling is sufficient to balance the sequences of elementary field operations for the point addition and point doubling, thus achieving at least a partial resistance against the timing and SPA attacks.

In the following, an addition operation is denoted by the symbol A, a multiplication operation is denoted by the symbol M, a squaring operation is denoted by the symbol S, and an inversion operation is denoted by the symbol I.

In order for the two algorithms for performing point addition and point doubling to include practically indistinguishable sequences of elementary operations in the underlying binary polynomial field, at least with respect to timing and power consumption, the sequence of symbols A, M, S, I corresponding to the sequence of field operations for the point addition should be identical to the sequence of symbols A, M, S, I corresponding to the sequence of field operations for the point doubling, the only difference being the operands to which these operations are applied. Also, the final results should be the same as those obtained by applying the formulas for the point addition and point doubling in affine coordinates given above.

Hereinafter, two exemplary algorithms are described, referred to as Algorithm 1 and Algorithm 2, respectively, for performing the point addition and the point doubling operations, respectively. The two algorithms Algorithm 1 and Algorithm 2 are balanced, i.e., include identical sequences of elementary field operations.

| Algorithm 1: Point addition in affine coordinates | |
|---|---|
| Input: | $a, Q = (x_1, y_1)$ in affine coordinates |
| | $P = (x_2, y_2)$ in affine coordinates, $P \neq Q$ and $P \neq O$ |
| Output: | $Q = Q + P = (x_1, y_1)$ in affine coordinates |
| Auxiliary variables: | u, v |
| if $\quad Q = O$ then | |
| $\quad Q \leftarrow P$ | |
| $\quad$ stop | |
| if $\quad Q = -P$ (i.e., $x_1 = x_2, y_1 = x_2 + y_2$) then | |
| $\quad Q \leftarrow O$ | |
| $\quad$ stop | |
| $u \leftarrow x_1 + x_2$ | |
| $u \leftarrow u^{-1}$ | |
| $v \leftarrow y_1 + y_2$ | |
| $u \leftarrow u \cdot v$ | |
| $v \leftarrow u + x_1$ | |
| $v \leftarrow u^2$ | |
| $v \leftarrow v + u$ | |
| $v \leftarrow v + x_2$ | |

-continued

Figure 1C:
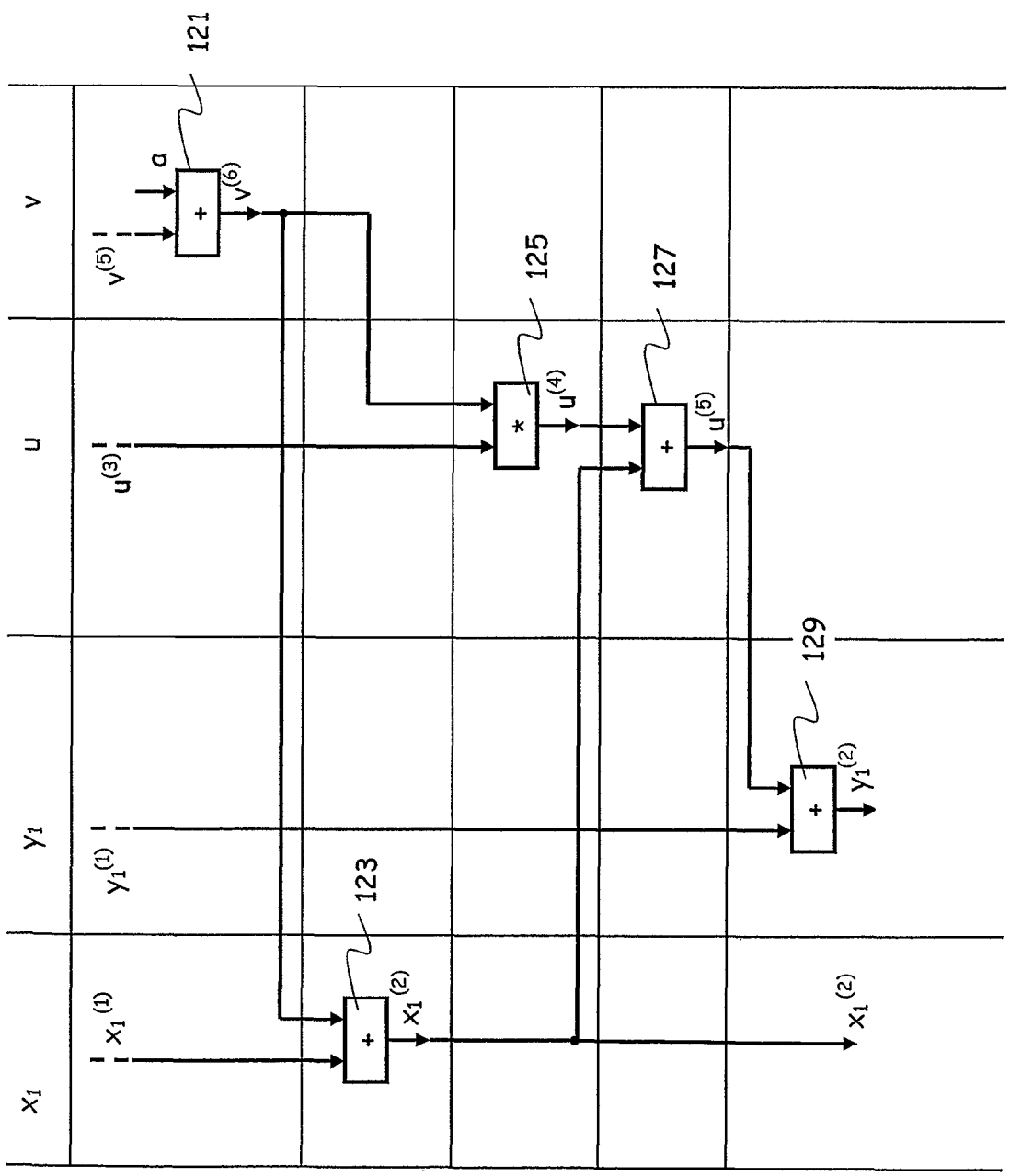

Algorithm 1: Point addition in affine coordinates $v \leftarrow v + a$
$x_1 \leftarrow x_1 + v$
$u \leftarrow u \cdot v$
$u \leftarrow u + x_1$
$y_1 \leftarrow y_1 + u$ In FIGS. 1A to 1C a schematic block diagram of a possible hardware implementation of the Algorithm 1 is presented. The auxiliary variables can be implemented by registers, latches, and the like.

At the beginning of the generic iteration of the double-and-add algorithm, it is first ascertained whether the point Q coincides with the point O (an operation schematized by the decision block 101): in the affirmative case, the point Q is set equal to the point P, and the computation stops. In the negative case, it is further ascertained whether the point Q is equal to the negative point −P (an operation schematized by the decision block 103): in the affirmative case, the point Q is set equal to the point O, and the computation stops.

In case neither of the two conditions above are satisfied, the initial value $x_1^{(1)}$ of the coordinate $x_1$ of the point Q is added (adder 105) to the initial value $x_2^{(1)}$ of the coordinate $x_2$ of the point P, to obtain a first value $u^{(1)}$ for the auxiliary variable u. Then, the first value $u^{(1)}$ for the auxiliary variable u is inverted (inverter 107) to obtain a second value $u^{(2)}$ for the auxiliary variable u. Afterwards, the initial value $y_1^{(1)}$ of the coordinate $y_1$ of the point Q is added (adder 109) to the initial value $y_2^{(1)}$ of the coordinate $y_2$ of the point P, to obtain a first value $v^{(1)}$ for the auxiliary variable v. Then, the second value $u^{(2)}$ for the auxiliary variable u is multiplied (multiplier 111) by the first value $v^{(1)}$ for the auxiliary variable v, to obtain a third value $u^{(3)}$ for the auxiliary variable u. The third value $u^{(3)}$ for the auxiliary variable u is then added (adder 113) to the initial value $x_1^{(1)}$ of the coordinate $x_1$ of the point Q, to obtain a second value $v^{(2)}$ for the auxiliary variable v. The third value $u^{(3)}$ for the auxiliary variable u is then multiplied by itself (multiplier 115) to obtain a third value $v^{(3)}$ for the auxiliary variable v. The third value $v^{(3)}$ for the auxiliary variable v is then added (adder 117) to the third value $u^{(3)}$ for the auxiliary variable u to obtain a fourth value $v^{(4)}$ for the auxiliary variable v. Then, the fourth value $v^{(4)}$ for the auxiliary variable v is added (adder 119) to the value $x_2^{(1)}$ of the coordinate $x_2$ of the point P, to obtain a fifth value $v^{(5)}$ for the auxiliary variable v. The fifth value $v^{(5)}$ for the auxiliary variable v is then added (adder 121) to the constant a, i.e., the elliptic curve parameter, to obtain a sixth value $v^{(6)}$ for the auxiliary variable v. The sixth value $v^{(6)}$ for the auxiliary variable v is then added (adder 123) to the initial value $x_1^{(1)}$ of the coordinate $x_1$ of the point Q, to obtain an updated, second value $x_1^{(2)}$ of the coordinate $x_1$ of the point Q. The third value $u^{(3)}$ for the auxiliary variable u is then multiplied (multiplier 125) by the sixth value $v^{(6)}$ for the auxiliary variable v, to obtain a fourth value $u^{(4)}$ for the auxiliary variable u. The fourth value $u^{(4)}$ for the auxiliary variable u is then added (adder 127) to the second value $x_1^{(2)}$ of the coordinate $x_1$ of the point Q to obtain a fifth value $u^{(5)}$ for the auxiliary variable u. Finally, the fifth value $u^{(5)}$ for the auxiliary variable u is added (adder 129) to the initial value $y_1^{(1)}$ of the coordinate $y_1$ of the point Q, to obtain an updated, second value $y_1^{(2)}$ of the coordinate $y_1$ of the point Q.

The second value $x_1^{(2)}$ of the coordinate $x_1$ and the second value $y_1^{(2)}$ of the coordinate $y_1$ form the output of the point addition operation (in the considered iteration of the double-and-add algorithm). The dummy operation is the addition performed by the adder 113.

Algorithm 2: Point doubling in affine coordinates

Figure 2A:
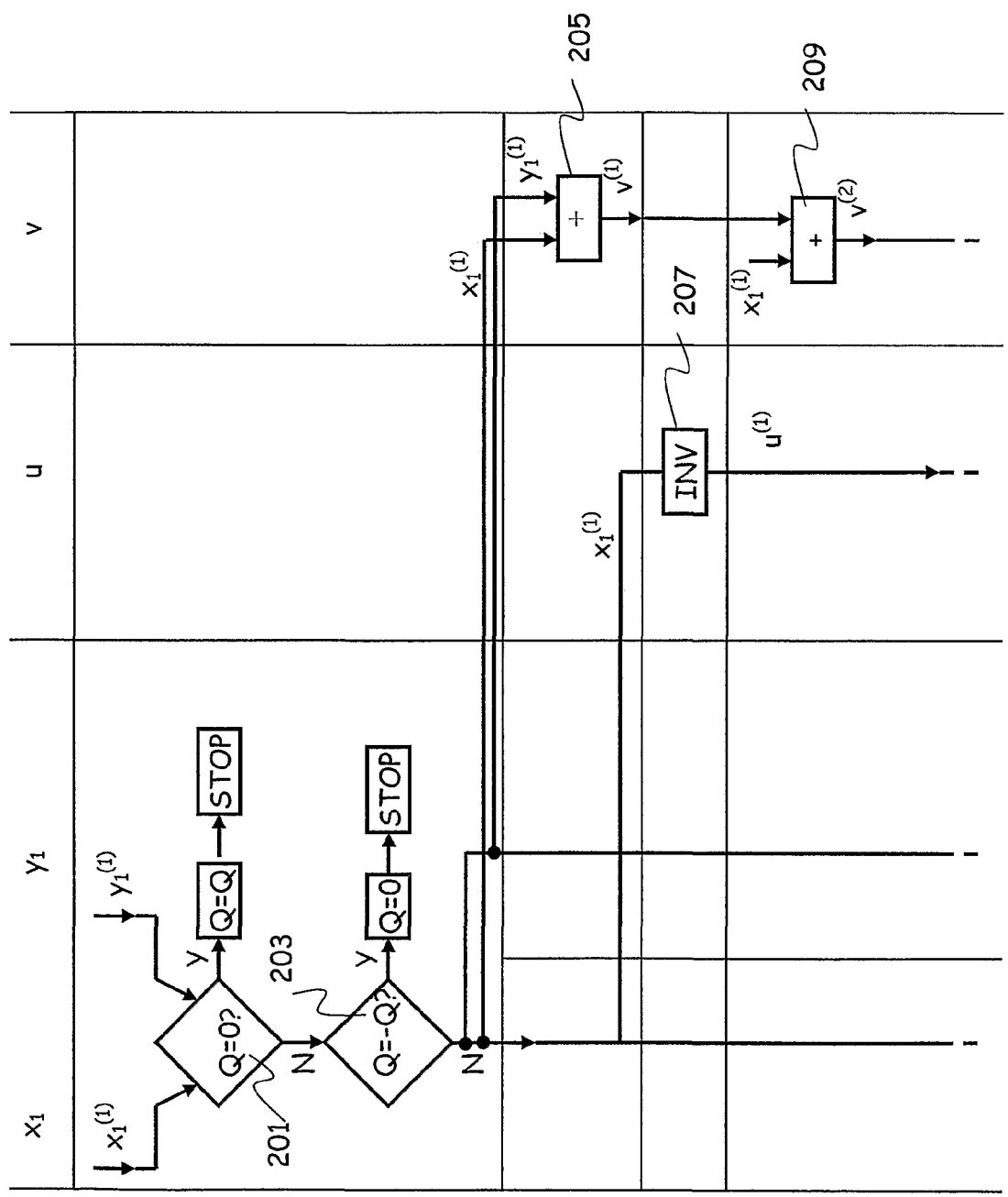
Figure 2C:
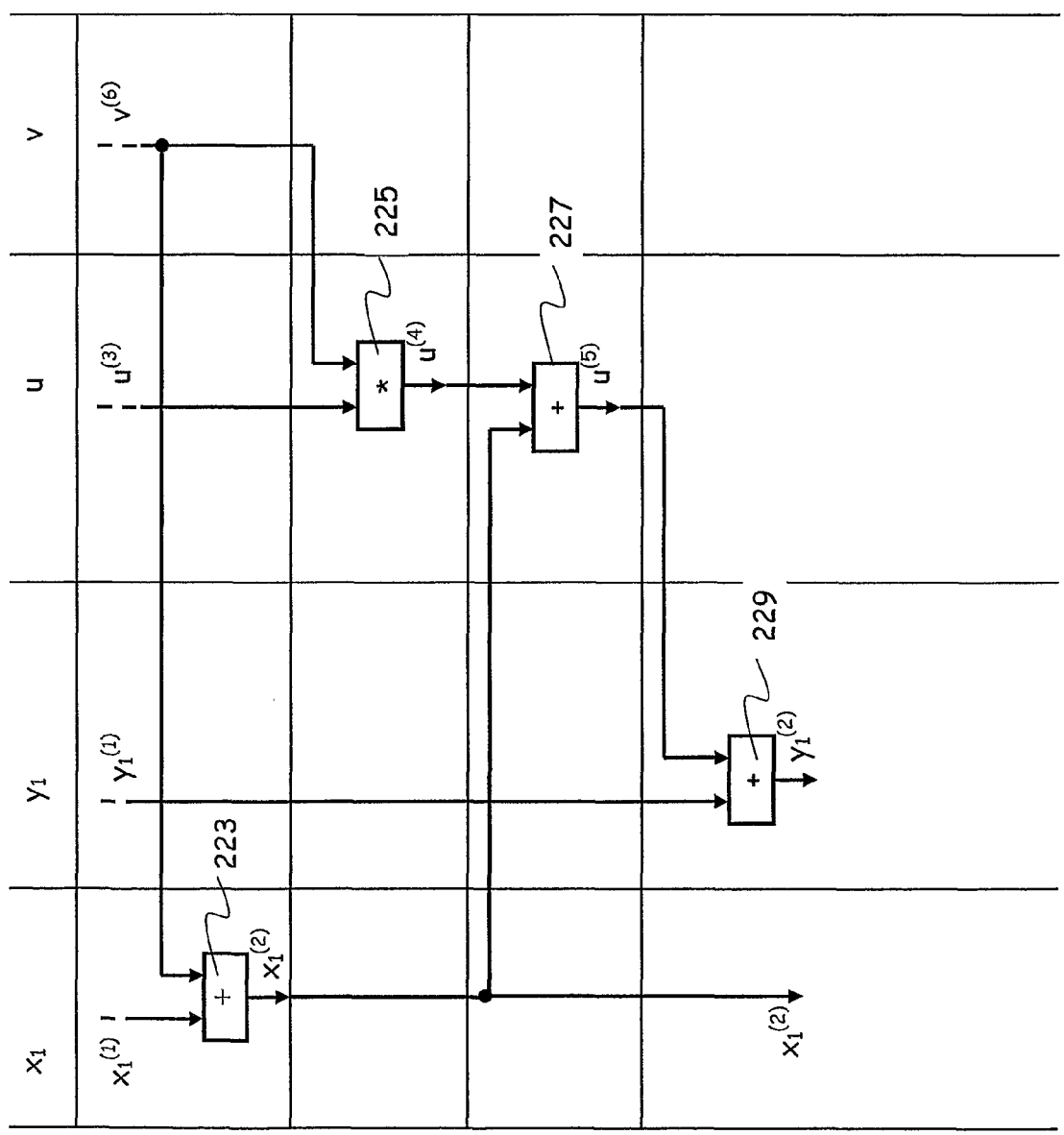

Input:       a, Q = $(x_1, y_1)$ in affine coordinates
Output:     Q = Q + Q = 2Q = $(x_1, y_1)$ in affine coordinates
Auxiliary variables:  u, v
if       Q = O then
        Q ← Q
        stop
if       Q = −Q (i.e., $x_1$ = 0) then
        Q ← O
        stop
$v \leftarrow y_1 + x_1$
$u \leftarrow x_1^{-1}$
$v \leftarrow v + x_1$
$u \leftarrow u \cdot v$
$u \leftarrow u + x_1$
$v \leftarrow u^2$
$v \leftarrow v + u$
$v \leftarrow v + x_1$
$v \leftarrow v + a$
$x_1 \leftarrow x_1 + v$
$u \leftarrow u \cdot v$
$w \leftarrow u + x_1$
$y_1 \leftarrow y_1 + u$ In FIGS. 2A to 2C a schematic block diagram of a possible hardware implementation of the Algorithm 2 is presented. Also in this case, the auxiliary variables can be implemented by registers, latches, and the like.

Also in this case, at the beginning of the generic iteration of the double-and-add algorithm, it is first ascertained whether the point Q coincides with the point O (an operation schematized by the decision block 201): in the affirmative case, the point Q is set equal to itself, and the computation stops. In the negative case, it is ascertained whether the point Q is equal to its negative −Q (an operation schematized by the decision block 203): in the affirmative case, the point Q is set equal to the point O, and the computation stops.

In case neither of the two conditions above is satisfied, the initial value $y_1^{(1)}$ of the coordinate $y_1$ of the point Q is added (adder 205) to the initial value $x_1^{(1)}$ of the coordinate $x_1$ of the point Q, to obtain a first value $v^{(l)}$ for the auxiliary variable v. Then, the initial value $x_1^{(l)}$ of the coordinate $x_1$ of the point Q is inverted (inverter 207) to obtain a first value $u^{(1)}$ for the auxiliary variable u. The first value $v^{(1)}$ for the auxiliary variable v is then added (adder 209) to the initial value $x_1^{(1)}$ of the coordinate $x_1$ of the point Q, to obtain a second value $v^{(2)}$ for the auxiliary variable v. Afterwards, the second value $v^{(2)}$ for the auxiliary variable v is multiplied (multiplier 211) by the first value $u^{(1)}$ for the auxiliary variable u to obtain a second value $u^{(2)}$ for the auxiliary variable u. The second value $u^{(2)}$ for the auxiliary variable u is then added (adder 213) to the initial value $x_1^{(l)}$ of the coordinate $x_1$ of the point Q, to obtain a third value $u^{(3)}$ for the auxiliary variable u. Then, the third value $u^{(3)}$ for the auxiliary variable u is multiplied by itself (multiplier 215) to obtain a third value $v^{(3)}$ for the auxiliary variable v. The third value $v^{(3)}$ for the auxiliary variable v is added (adder 217) to the third value $u^{(3)}$ for the auxiliary variable u to obtain a fourth value $v^{(4)}$ for the auxiliary variable v. The fourth value $v^{(4)}$ for the auxiliary variable v is then added (adder 219) to initial value $x_1^{(l)}$ of the coordinate $x_1$ of the point Q, to obtain a fifth value $v^{(5)}$ for the auxiliary variable v. The fifth value $v^{(5)}$ for the auxiliary variable v is then added (adder 221) to the constant α, to obtain a sixth value $v^{(6)}$ for the auxiliary variable v. The sixth value $v^{(6)}$ for the auxiliary variable v is then added (adder 223) to the initial value $x_1^{(1)}$ of the coordinate $x_1$ of the point Q, to obtain an updated, second value $x_1^{(2)}$ of the coordinate $x_1$ of the point Q. The third value $u^{(3)}$ for the auxiliary variable u is then multiplied (multiplier 225) by the sixth value $v^{(6)}$ for the auxiliary variable v to obtain a fourth value $u^{(4)}$ for the auxiliary variable u. The fourth value $u^{(4)}$ for the auxiliary variable u is added (adder 227) to the second value $x_1^{(2)}$ of the coordinate $x_1$ of the point Q, to obtain a fifth value $u^{(5)}$ for the auxiliary variable u. Finally, the fifth value $u^{(5)}$ for the auxiliary variable u is added (adder 229) to the initial value $y_1^{(1)}$ of the coordinate $y_1$ of the point Q, to obtain an updated, second value $y_1^{(2)}$ of the coordinate $y_1$ of the point Q.

The second value $x_1^{(2)}$ of the coordinate $x_1$ and the second value $y_1^{(2)}$ of the coordinate $y_1$ form the output of the point doubling (in the considered iteration of the double-and-add algorithm). The dummy operations are the two additions performed by the adders 205 and 209 as well as the two additions performed by the adders 219 and 223, which are equivalent to one effective addition, which makes a total of three dummy additions.

In the two algorithms Algorithm 1 (point addition) and Algorithm 2 (point doubling) set forth above, it is assumed that the resulting point Q is stored in one of the operands, that is, as the updated value of the point Q, as this is convenient for the scalar multiplication algorithms such as the double-and-add algorithm. However, this is not to be intended as a limitation of the present invention.

The corresponding sequence of elementary operations in both the algorithms Algorithm 1 and Algorithm 2 (the sequence of operations is the same for both the algorithms), is thus:

AIAMASAAAAMAA;

the sequence has a total length of thirteen operations, and consists of one I operation (inversion), two M operations (multiplications), one S operation (squaring operation) and nine A operations (additions). As mentioned above, the sequence for Algorithm 1 contains one dummy A operation, whereas the sequence for Algorithm 2 contains three dummy A operations. As the complexity of an A operation is negligible in comparison with M and I operations, the inserted dummy A operations have virtually no cost. The number of auxiliary variables is two for both algorithms. The addition is generally performed with different operands (note that the addition of the same operands, yielding zero as a result, can in principle be distinguished from the addition of different operands). Addition with a constant, α, is performed at the same place in both algorithms.

For the sake of completeness, as in the scalar multiplication algorithms it may happen that Q=O, the initial test, being essentially the same for both the algorithms, is also included in their description. In fact, in the scalar multiplication algorithms such as the double-and-add algorithm, the initialization condition Q=O implies that this test is needed in both the algorithms in the first, initial iteration. However, if it is known that the scalar bit in the first iteration (e.g., the most significant bit in the left-to-right versions) is equal to 1, then this test can be omitted by assuming the initialization condition Q=P and by running the scalar multiplication from the second iteration onwards. On the other hand, if the scalar, k, is not bigger than the order, n, of the base point P, i.e., if k≦n, then, except in the initial iteration, the condition Q=O may happen only at the end of the algorithm and this happens if and only if k=n.

For the sake of completeness, the test whether the output of the point addition and point doubling algorithms is equal to O (i.e., Q=O at the output) is included in their description. This test can be omitted if k<n, because this condition cannot then be satisfied during the double-and-add algorithm, as explained above.

It is to be noted that the input conditions P=Q and P=0 are not allowed in Algorithm 1. The condition P≠O is satisfied by the choice of P. In the scalar multiplication algorithms such as the double-and-add algorithm, the condition P≠Q is automatically satisfied if k≦n.

It is pointed out that the present invention is not limited to the two algorithms Algorithm 1 and Algorithm 2 set forth above. Any simple transformation of Algorithms 1 and 2, including for example a permutation of the elementary field operations, an addition of more dummy operations, an addition of more auxiliary variables, such that the two corresponding sequences of elementary field operations are essentially the same and that the final results are not changed, is also intended to be covered by the present invention.

The Applicant observed that balanced sequences of field operations for the point addition and point doubling, in a way explained as above, are not sufficient for the resistance against the timing and SPA attacks, as the computationally most expensive operation, the field inversion, is significantly dependent on the operand being inverted, with respect to timing and power consumption. In particular, the scalar multiplication algorithms may still be vulnerable to the timing attacks utilizing multiple measurements, obtained for the same secret scalar and various base points P. Such an attack would consist in guessing a number of most significant bits of the secret scalar and in identifying the right guess by analyzing the timings (and possibly also the shapes of power consumption curves) of the corresponding operations in the (left-to-right) double-and-add algorithm.

In a preferred embodiment of this invention, the field inversion is performed on the basis of the Extended Euclidean Algorithm, in a form that is balanced in order to achieve a higher resistance against the timing and SPA attacks. Hereinafter, two exemplary balanced algorithms are described, referred to as Algorithm 3 and Algorithm 4, respectively, for performing the field inversion on the basis of the known Extended Euclidean Algorithm.

---

Algorithm 3: Inversion - Basic Extended Euclidean Algorithm

Input: $a = (a_{m-1}, a_{m-2}, \ldots, a_1, a_0)_2$, $a \neq 0$
$\quad\quad\quad f = (f_m, f_{m-1}, \ldots, f_1, f_0)_2$, $f_m = f_0 = 1$
Output: $c = (c_{m-1}, c_{m-2}, \ldots, c_1, c_0)_2 = a^{-1} \bmod f$
Auxiliary variables: $u_1, u_2, v, w$
$u_1(z) \leftarrow a(z)$, $u_2(z) \leftarrow f(z)$
$c(z) \leftarrow 1$, $v(z) \leftarrow 0$
while $\deg u_1(z) > 0$
$\quad j \leftarrow \deg u_1(z) - \deg u_2(z)$
$\quad$ if $j < 0$ then
$\quad\quad j \leftarrow -j$
$\quad\quad w(z) \leftarrow u_2(z)$, $u_2(z) \leftarrow u_1(z)$, $u_1(z) \leftarrow w(z)$
$\quad\quad w(z) \leftarrow v(z)$, $v(z) \leftarrow c(z)$, $c(z) \leftarrow w(z)$
$\quad$ else
$\quad\quad j \leftarrow j$
$\quad\quad w(z) \leftarrow u_1(z)$, $u_2(z) \leftarrow u_2(z)$, $u_1(z) \leftarrow w(z)$
$\quad\quad w(z) \leftarrow c(z)$, $v(z) \leftarrow v(z)$, $c(z) \leftarrow w(z)$
$w(z) \leftarrow z^j u_2(z)$
$u_1(z) \leftarrow u_1(z) + w(z)$
$w(z) \leftarrow z^j v(z)$
$c(z) \leftarrow c(z) + w(z)$ Algorithm 4: Inversion - Modified Extended Euclidean Algorithm Input:   $a = (a_{m-1}, a_{m-2}, \ldots, a_1, a_0)_2$,  $a \neq 0$
         $f = (f_m, f_{m-1}, \ldots, f_1, f_0)_2$,  $f_m = f_0 = 1$
Output:  $c = (c_{m-1}, c_{m-2}, \ldots, c_1, c_0)_2 = a^{-1} \bmod f$
Auxiliary variables: $u_1, u_2, v, w_1, w_2$
$u_1(z) \leftarrow a(z)$,  $u_2(z) \leftarrow f(z)$
$c(z) \leftarrow 1$,  $v(z) \leftarrow 0$
while  $\deg u_1(z) > 0$
   if  $\deg u_2(z) > \deg u_1(z)$ then
      $w_1(z) \leftarrow u_2(z)$,  $u_2(z) \leftarrow u_1(z)$,  $u_1(z) \leftarrow w_1(z)$
      $w_2(z) \leftarrow v(z)$,  $v(z) \leftarrow c(z)$,  $c(z) \leftarrow w_2(z)$
   else
      $w_1(z) \leftarrow u_1(z)$,  $u_2(z) \leftarrow u_2(z)$,  $u_1(z) \leftarrow w_1(z)$
      $w_2(z) \leftarrow c(z)$,  $v(z) \leftarrow v(z)$,  $c(z) \leftarrow w_2(z)$
   $w_1(z) \leftarrow u_2(z)$
   $w_2(z) \leftarrow v(z)$
   while  $\deg u_1(z) > \deg w_1(z)$
      $w_1(z) \leftarrow z w_1(z)$
      $w_2(z) \leftarrow z w_2(z)$
   $u_1(z) \leftarrow u_1(z) + w_1(z)$
   $c(z) \leftarrow c(z) + w_2(z)$ The basic version of the Extended Euclidean Algorithm, i.e., Algorithm 3 requires a hardware block (i.e., logic circuit) for computing a degree ("deg", in the algorithms) of a polynomial and a simple hardware block for computing the difference of two degrees, as well as supplementary integer variables of small bit size for storing the degrees. Since for larger values of m, the gate count and the delay of this block may be significant, the modified version of the algorithm, i.e., Algorithm 4 requires a hardware block for comparing the degrees of two polynomials only, and the gate count and the delay of this hardware block may be smaller. The last inner loop of the modified algorithm takes a number of clock cycles and requires another supplementary variable, but this number is on average very small.

It can be appreciated that both the basic and the modified algorithms have a number of dummy operations in each step of the outer loop, when $j \geq 0$ (or, correspondingly, when $\deg u_2(z) \geq \deg u_1(z)$), to (at least partially) balance the total timing and power consumption. Namely, if the Extended Euclidean Algorithm is implemented without these dummy operations, then the resulting information leakage due to the absence of the corresponding operations when $j \geq 0$ (or $\deg u_2(Z) \geq \deg u_1(z)$) may possibly be used in the timing and SPA attacks.

As the degree of the polynomial $u_1(z)$ in each step of the outer loop is on average reduced by 2, the average number of steps in the outer loop is about m/2. If each step is implemented in only several clock cycles by using the appropriate hardware blocks, then the number of clock cycles required for one inversion is not much larger than that for one multiplication, as desired. On the other hand, if the hardware blocks and registers deal with less than m bits at a time, than the required number of clock cycles is roughly proportionally increased.

In the practice, the balanced point addition and point doubling algorithms Algorithm 1 and Algorithm 2 together with a balanced algorithm for the field inversion Algorithm 3 or 4, being the building blocks of the double-and-add algorithm, are expediently used in scalar multiplication algorithms, which are essential to cryptosystems such as the cryptographic protocols ECDH for Diffie-Hellman secret key exchange and ECDSA for digital signatures.

More generally, Algorithms 1, 2, 3, and 4 can be exploited in any scalar multiplication algorithm defined as a sequence of point additions, doublings, and subtractions in the underlying elliptic curve group. It is to be noted that the point subtraction Q−P can be performed as a point addition Q+(−P), where the negative of a point P=(x,y), −P=(x,x⊕y), is computed by just one extra polynomial addition, or it can be computed in advance and stored. In particular, in addition to being applicable in the double-and-add algorithm, for example in the left-to-right form set forth in the foregoing, the two balanced algorithms Algorithm 1 and Algorithm 2 can be exploited in scalar multiplication algorithms that use a signed binary representation of the scalar, possibly in a Non-Adjacent Form (NAF), where the scalar is represented as $$k = (k_{t-1}, k_{t-2}, \ldots, k_1, k_0)_2 = \sum_{i=0}^{t-1} k_i 2^i,$$

with the coefficients $k_i$ taking values 0, 1, and −1, and, as provided by the NAF, without adjacent non-zero digits (the advantage of the NAF resides in a reduced number of non-zero digits when compared with the standard binary representation). An example of these algorithms is the so called "double-and-add-or-subtract" algorithm, which can be used to perform the scalar multiplication, and can be expressed, for example, as follows (in the left-to-right form):

Double-and-add-or-subtract, left-to-right scalar multiplication

Input:   $k = (k_{t-1}, k_{t-2}, \ldots, k_1, k_0)_2$
         $P = (x_1, y_1)$ in affine coordinates
Output:  $Q = kP$ in affine coordinates
$Q \leftarrow O$
for i from $t - 1$ down to 0
   $Q \leftarrow 2Q$
   if $k_1 = 1$   then  $Q \leftarrow Q + P$
   if $k_1 = -1$  then  $Q \leftarrow Q - P$ According to a preferred embodiment of the present invention, in order to further increase a resistance to the timing and SPA attacks and to practically eliminate the leakage of the scalar Hamming weight in the double-and-add type of scalar multiplication algorithms, as well as to achieve a practical resistance against the DPA attacks, the use of the proposed balanced algorithms for the point addition, point doubling, and field inversion is proposed to be combined with the scalar randomization, by using a sufficiently large random number (e.g., 32 to 128 bits long), depending on the desired security level.

In particular, the secret scalar k can be randomized by adding thereto a random integer multiple of the order n of the base point P according to $k \leftarrow k+rn$, in view of $kP=kP+rnP=(k+rn)P$ because of $nP=O$. In the cryptographic protocols such as ECDH and ECDSA, the order n of the base point and the scalar k both have almost the same bit size as the bit size m of the field. If k is from 160 to 512 bits long, then the random number r is suggested to be from 32 to 128 bits long, depending on the desired security level, thus not degrading the performance significantly.

It is pointed out that, even with the randomization of the scalar k, it is possible to guarantee that in each iteration of the, e.g., double-and-add algorithm it is true that $Q \neq P$ (so that the addition of different points is performed after the point doubling) provided that $k<n$ and the difference of the bit lengths of k and r is greater than 2. Furthermore, if $k<n$ and the difference of the bit lengths of k and r is greater than 0, then, except in the initial iteration, the condition Q=0 may not happen during the further iterations of the algorithm.

The algorithms for executing the other elementary arithmetic operations in the underlying binary polynomial field, apart from the field inversion, appearing in Algorithm 1 and Algorithm 2, that is, the addition, squaring operation, and multiplication should preferably be designed by respecting a number of criteria related to the resistance against side-channel attacks. Firstly, with respect to timing attacks, the timings of the algorithms implementing the elementary operations should be roughly independent of the inputs. Secondly, with respect to SPA attacks, they should be performed as sequences of elementary computations that are roughly independent of the inputs. Finally, for preferred hardware implementations, they should be simple and fast and, in particular, they may be bit based. In the case of software implementations, they should be word rather than bit based.

Hereinbelow, preferred embodiments for the algorithms for the addition, squaring operation, and multiplication in the underlying binary polynomial field are provided. In the squaring and multiplication algorithms, the reduction polynomial of the binary polynomial field representation is denoted as f. All the algorithms are essentially known, but contain minor adjustments in order to be more balanced with respect to timing and power consumption.

---

Addition

Input: $a = (a_{m-1}, a_{m-2}, \ldots, a_1, a_0)_2$
$b = (b_{m-1}, b_{m-2}, \ldots, b_1, b_0)_2$
Output: $c = (c_{m-1}, c_{m-2}, \ldots, c_1, c_0)_2 = a + b$
for i from 0 to m − 1
$\quad c_i \leftarrow a_i + b_i \pmod{2}$

---

Squaring

Input: $a = (a_{m-1}, a_{m-2}, \ldots, a_1, a_0)_2$
$f = (f_m, f_{m-1}, \ldots, f_1, f_0)_2, \quad f_m = f_0 = 1$
Output: $c = (c_{m-1}, c_{m-2}, \ldots, c_1, c_0)_2 = a^2 \bmod f$
Auxiliary Variable: $c = (c_{2m-2}, c_{2m-1}, \ldots, c_1, c_0)_2$
$c \leftarrow (a_{m-1}, 0, a_{m-2}, 0, \ldots, a_1, 0, a_0)_2$
for i from 2m − 2 down to m
$\quad$ for j from 0 to m − 1
$\quad\quad c_{i-m+j} \leftarrow c_{i-m+j} + f_j c_i$

---

Multiplication - Shift-and-Add, Left-to-Right

Input: $a = (a_{m-1}, a_{m-2}, \ldots, a_1, a_0)_2$
$a = (b_{m-1}, b_{m-2}, \ldots, b_1, b_0)_2$
$f = (f_m, f_{m-1}, \ldots, f_1, f_0)_2, \quad f_m = f_0 = 1$
Output: $c = (c_{m-1}, c_{m-2}, \ldots, c_1, c_0)_2 = (a \cdot b) \bmod f$
Auxiliary variable: u
$c(z) \leftarrow 0$
for i from m − 1 down to 0
$\quad u \leftarrow c_{m-1}$
$\quad c(z) \leftarrow zc(z) = (c_{m-2}, c_{m-3}, \ldots, c_1, c_0, 0)$ (left shift)
$\quad c(z) \leftarrow c(z) + u(z^m + f(z))$ (addition)
$\quad c(z) \leftarrow c(z) + a_i b(z)$ (addition)

Note:
$z^m + f(z) = (0, f_{m-1}, f_{m-2}, \ldots, f_1, f_0)$

---

It is pointed out that the algorithms described above are merely exemplary and not limitative to the present invention; alternative ways to perform the elementary operations exist; for example, a squaring operation can be implemented as a multiplication.

Preferably, in hardware implementations, especially for the bit sizes in the range $m \leq 256$, all the involved variables from the field $F_{2^m}$ should be stored in m-bit registers. In this case, an update of a variable takes only one clock cycle and, also, inner loops of m steps for both addition and squaring can be implemented in only one clock cycle, respectively. If the required left shifts and additions within each step of the outer loop are all implemented in one clock cycle, then both squaring and multiplication can be implemented in about m cycles only, respectively.

For the ECDSA cryptographic protocol, additional operations are required; for example, it is required to perform some modular integer arithmetic including addition, multiplication, and inversion, where the modulus is the (prime) order, n, of the base point used, which has about the same bit size as the underlying field. These integer operations may also be implemented in hardware, and the main computational effort is required for the inversion. The inversion operation modulo a prime integer, that is, in the prime field can be implemented by using one of the standard algorithms. If the prime field multiplication is implemented in hardware, by a dedicated hardware module, then it could suffice to implement the inversion as an exponentiation, in view of the fact that in the prime field with n elements, it is true that $z^{-1} = z^{n-2}$. This is especially efficient if the exponentiation itself is also implemented in hardware, in terms of the multiplication, possibly by using a square-and-multiply algorithm. Besides, ordinary integer addition is required for randomizing the scalar in randomized scalar multiplication algorithms.

An ECC may be implemented by an integrated circuit chip, which in turn can be embedded in a smart card or any other portable support like a USB key.

An ECC may be implemented by an integrated circuit chip, which in turn can be embedded in a smart card or any other portable support like a USB key.

Figure 3:
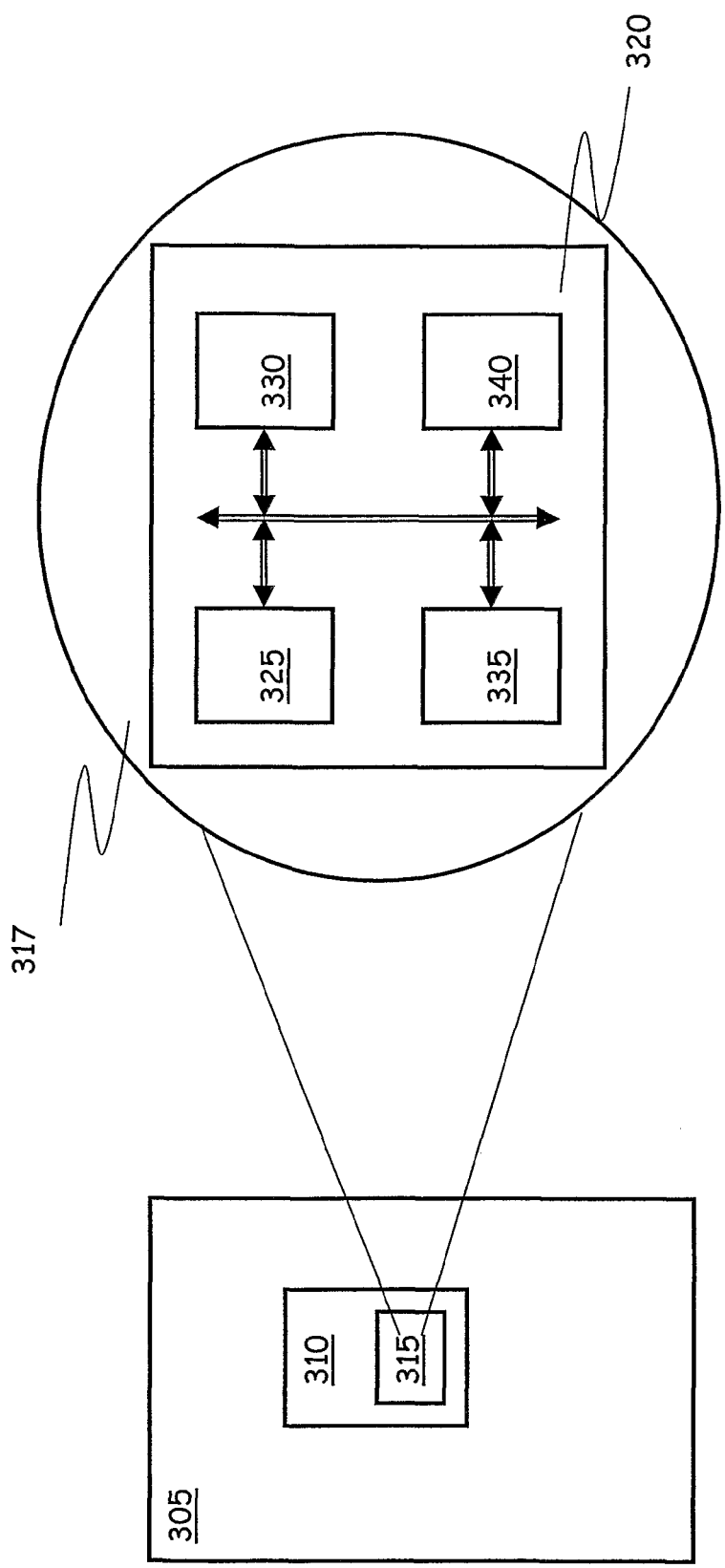
FIG. 3 shows a communication device configured to implement the encryption technique of the present invention.

For example, in FIG. 3, a possible application of the present invention is pictorially shown; reference numeral 305 denotes a user device, like for example a cellular phone, e.g., a UMTS phone; the phone 305 operates based on a Subscriber Identify Module (SIM) card 310, which is a smart card with an embedded IC chip 315. The IC chip 315 implements, among other functions, a cryptosystem 317, particularly an ECC, e.g., an ECDH or an ECDSA. The ECC 317 includes a scalar multiplication unit 320, adapted to perform multiplications of data represented as elliptic curve points by a scalar k, for example, a secret encryption key. The scalar multiplication unit 320 includes in particular four interconnected sub-units: a point addition unit 325, a point doubling unit 330, a field arithmetic unit 335, adapted to perform elementary arithmetic operations in the binary polynomial field, and a control unit 340, supervising the operation of the scalar multiplication unit.

The present invention was disclosed by means of some exemplary embodiments thereof, however those skilled in the art, in order to satisfy contingent needs, will readily devise modifications to the described embodiments, as well as alternative embodiments, without for this reason departing from the protection scope defined in the appended claims.

The invention claimed is:

1. A method for transforming data with a secret parameter in an elliptic curve cryptosystem based on an elliptic curve defined over an underlying binary polynomial field, comprising:

multiplying, by a integrated circuit, a point of the elliptic curve, said point representing the data to be transformed, by a scalar representing the secret parameter, wherein said multiplying comprises performing at least one point addition operation and at least one point doubling operation on points of the elliptic curve, said point addition operation comprising a first sequence of elementary field operations and said point doubling operation comprising a second sequence of elementary field operations, both said first and second sequence of elementary field operations comprising a field inversion of coordinates of the elliptic curve points;

providing, by the integrated circuit, a representation of the elliptic curve points in affine coordinates; and balancing, by the integrated circuit, said first and second sequences of elementary field operations by adding at least one dummy addition operation, wherein said field inversion of coordinates is performed by an extended Euclidean algorithm and said balancing comprises balancing said extended Euclidean algorithm by adding the at least one dummy addition operation; and wherein both said first sequence of elementary field operations and said second sequence of elementary field operations comprise a first type of field operations, a second type of field operations, a third type of field operations, and a fourth type of field operations, wherein:

said first type of field operations comprises field addition of coordinates of the elliptic curve points;

said second type of field operations comprises field inversion of coordinates of the elliptic curve points;

said third type of field operations comprises field multiplication of coordinates of the elliptic curve points; and said fourth type of field operations comprises field squaring of coordinates of the elliptic curve points;

said first and second sequences comprising:
at least one first operation of the first type;
at least one second operation of the second type;
at least one third operation of the first type;
at least one fourth operation of the third type;
at least one fifth operation of the first type;
at least one sixth operation of the fourth type;
at least four seventh consecutive operations of the first type;
at least one eighth operation of the third type; and
at least two ninth consecutive operations of the first type.

2. The method according to claim 1, wherein said balancing the extended Euclidean algorithm comprises:

after comparing respective degrees of two binary polynomials being iteratively processed in the algorithm, performing a same sequence of operations regardless of the result of said comparing.

3. The method according to claim 1, wherein said field inversion is executed according to the algorithm:

---
$u_1(z) \leftarrow a(z)$, $u_2(z) \leftarrow f(z)$
$c(z) \leftarrow 1$, $v(z) \leftarrow 0$
while deg $u_1(z) > 0$
    $j \leftarrow \deg u_1(z) - \deg u_2(z)$
    if $j < 0$ then
        $j \leftarrow -j$
        $w(z) \leftarrow u_2(z)$, $u_2(z) \leftarrow u_1(z)$, $u_1(z) \leftarrow w(z)$
        $w(z) \leftarrow v(z)$, $v(z) \leftarrow c(z)$, $c(z) \leftarrow w(z)$
    else
        $j \leftarrow j$
        $w(z) \leftarrow u_1(z)$, $u_2(z) \leftarrow u_2(z)$, $u_1(z) \leftarrow w(z)$
        $w(z) \leftarrow c(z)$, $v(z) \leftarrow v(z)$, $c(z) \leftarrow w(z)$
    $w(z) \leftarrow z^j u_2(z)$
    $u_1(z) \leftarrow u_1(z) + w(z)$
    $w(z) \leftarrow z^j v(z)$
    $c(z) \leftarrow c(z) + w(z)$
--- wherein $a = (a_{m-1}, a_{m-2}, \ldots, a_1, a_0)_2$ $a \neq 0$, is a binary polynomial to be inverted, $f = (f_m, f_{m-1}, \ldots, f_1, f_0)_2$, $f_m = f_0 = 1$, is a reduction binary polynomial, $c = (c_{m-1}, c_{m-2}, \ldots c_1, c_0)_2 = a^{-1} \bmod f$ is an output polynomial being the result of the inversion, and $u_1$, $u_2$, $v$, $w$ are auxiliary variables.

4. The method according to claim 1, wherein said field inversion is executed according to the algorithm:

---
$u_1(z) \leftarrow a(z)$, $u_2(z) \leftarrow f(z)$
$c(z) \leftarrow 1$, $v(z) \leftarrow 0$
while deg $u_1(z) > 0$
    if $\deg_2 u_2(z) > \deg u_1(z)$ then
        $w_1(z) \leftarrow u_2(z)$,   $u_2(z) \leftarrow u_1(z)$,   $u_1(z) \leftarrow w_1(z)$
        $w_2(z) \leftarrow v(z)$,   $v(z) \leftarrow c(z)$,   $c(z) \leftarrow w_2(z)$
    else
        $w_1(z) \leftarrow u_1(z)$,   $u_2(z) \leftarrow u_2(z)$,   $u_1(z) \leftarrow w_1(z)$
        $w_2(z) \leftarrow c(z)$,   $v(z) \leftarrow v(z)$,   $c(z) \leftarrow w_2(z)$
$w_1(z) \leftarrow u_2(z)$
$w_2(z) \leftarrow v(z)$
while deg $u_1(z) > \deg w_1(z)$
    $w_1(z) \leftarrow z w_1(z)$
    $w_2(z) \leftarrow z w_2(z)$
$u_1(z) \leftarrow u_1(z) + w_1(z)$
$c(z) \leftarrow c(z) + w_2(z)$
--- wherein $a = (a_{m-1}, a_{m-2}, \ldots, a_1, a_0)_2$ $a \neq 0$, is a binary polynomial to be inverted, $f = (f_m, f_{m-1}, \ldots, f_1, f_0)_2$, $f_m = f_0 = 1$, is a reduction binary polynomial, $c = (c_{m-1}, c_{m-2}, \ldots c_1, c_0)_2 = a^{-1} \bmod f$ is an output polynomial being the result of the inversion, and $u_1$, $u_2$, $v$, $w$ are auxiliary variables.

5. The method according to claim 1, wherein said field addition is executed on the basis of the algorithm:

for i from 0 to m−1

$$c_i = a_i + b_i (\bmod 2)$$

wherein $a = (a_{m-1}, a_{m-2}, \ldots, a_1, a_0)_2$ and $b = (b_{m-1}, b_{m-2}, \ldots, b_1, b_0)_2$ are input binary polynomials to be added, and $c = (c_{m-1}, c_{m-2}, \ldots, c_1, c_0)_2 = a + b$ is the resulting binary polynomial.

6. The method according to claim 1, wherein said field squaring is executed on the basis of the algorithm:

$$c = (a_{m-1}, 0, a_{m-2}, 0, \ldots, a_1, 0, a_0)_2$$

for i from 2m−2 down to m
    for j from 0 to m−1

$$c_{i-m+j} = c_{i-m+j} + f_j c_i$$

wherein $a = (a_{m-1}, a_{m-2}, \ldots, a_1, a_0)_2$ is an input binary polynomial to be squared, $f = f_m, f_{m-1}, \ldots, f_1, f_0)_2$, $f_m = f_0 = 1$ is a reduction binary polynomial, $c = (c_{m-1}, c_{m-2}, \ldots, c_1, c_0)_2 = a^2 \bmod f$ is an output polynomial resulting from the squaring, and $c = (c_{2m-2}, c_{2m-1}, \ldots, c_1, c_0)_2$ is an auxiliary variable.

7. The method according to claim 1, wherein said field multiplication is executed on the basis of the algorithm:

---
$c(z) = 0$
for i from m−1 down to 0
    $u = c_{m-1}$

-continued

| | |
|---|---|
| $c(z) = zc(z) = (c_{m-2}, c_{m-3}, \ldots, c_1, c_0, 0)$ | (left shift) |
| $c(z) = c(z) + u(z^m + f(z))$ | (addition) |
| $c(x) = c(x) + a_i b(x)$ | (addition) | with $z^m + f(z) = (0, f_{m-1}, f_{m-2}, \ldots, f_1, f_0)$, wherein $a = (a_{m-1}, a_{m-2}, \ldots, a_1, a_0)_2$ and
$b = (b_{m-1}, b_{m-2}, \ldots, b_1, b_0)_2$ are input binary polynomials to be multiplied,
$f = (f_m, f_{m-1}, \ldots, f_1, f_0)_2$, $f_m = f_0 = 1$, is a reduction binary polynomial,
$c = (c_{m-1}, c_{m-2}, \ldots, c_1, c_0)_2 = (a \cdot b) \bmod f$ is a binary polynomial resulting from the multiplication, and u is an auxiliary variable.

8. The method according to claim 1, further comprising randomizing the scalar by adding a random number to the scalar, said random number being an integer multiple of an order of the point of the elliptic curve to be multiplied by this scalar.

9. The method according to claim 1, wherein said multiplying a point of the elliptic curve by a scalar is performed on the basis of one among a double-and-add algorithm and a double-add-and-subtract algorithm.

10. The method of claim 1, wherein the integrated circuit is embedded in a portable support or a smart card.

* * * * *